United States Patent
Ybarra et al.

(10) Patent No.: US 9,305,142 B1
(45) Date of Patent: Apr. 5, 2016

(54) BUFFER MEMORY PROTECTION UNIT

(75) Inventors: Danny O. Ybarra, Mission Viejo, CA (US); Marvin R. Deforest, Niwot, CO (US); Alan T. Meyer, Anaheim Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 93 days.

(21) Appl. No.: 13/330,450

(22) Filed: Dec. 19, 2011

(51) Int. Cl.
G06F 12/00 (2006.01)
G06F 21/00 (2013.01)
G06F 12/14 (2006.01)
G06F 21/62 (2013.01)

(52) U.S. Cl.
CPC ............ *G06F 21/00* (2013.01); *G06F 12/1458* (2013.01); *G06F 21/62* (2013.01)

(58) Field of Classification Search
CPC ...... G06F 21/00; G06F 21/62; G06F 12/1458
See application file for complete search history.

(56) References Cited

U.S. PATENT DOCUMENTS

| | | | |
|---|---|---|---|
| 5,058,162 A | 10/1991 | Santon et al. | |
| 5,191,611 A | 3/1993 | Lang | |
| 5,293,610 A | 3/1994 | Schwarz | |
| 5,297,283 A * | 3/1994 | Kelly et al. | 718/104 |
| 5,418,927 A | 5/1995 | Chang et al. | |
| 5,442,704 A * | 8/1995 | Holtey | 711/163 |
| 5,530,960 A | 6/1996 | Parks et al. | |
| 5,623,637 A | 4/1997 | Jones et al. | |
| 5,805,800 A | 9/1998 | Kotani et al. | |
| 6,003,117 A | 12/1999 | Buer et al. | |
| 6,006,190 A | 12/1999 | Baena-Arnaiz et al. | |
| 6,061,449 A | 5/2000 | Candelore et al. | |
| 6,190,257 B1 * | 2/2001 | Takeda et al. | 463/29 |
| 6,321,314 B1 | 11/2001 | Van Dyke | |
| 6,523,118 B1 | 2/2003 | Buer | |
| 6,633,963 B1 | 10/2003 | Ellison et al. | |
| 6,735,650 B1 | 5/2004 | Rothberg | |
| 6,738,904 B2 | 5/2004 | Linnartz et al. | |
| 6,823,398 B1 | 11/2004 | Lee et al. | |
| 6,845,387 B1 | 1/2005 | Prestas et al. | |
| 6,895,506 B1 | 5/2005 | Abu-Husein | |
| 6,968,459 B1 | 11/2005 | Morgan et al. | |
| 7,043,615 B1 * | 5/2006 | Kobayashi et al. | 711/163 |
| 7,093,139 B2 | 8/2006 | Silverbrook et al. | |
| 7,149,854 B2 | 12/2006 | Weber et al. | |
| 7,215,771 B1 | 5/2007 | Hamlin | |
| 7,330,970 B1 | 2/2008 | Field | |
| 7,376,898 B1 | 5/2008 | Yehuda et al. | |
| 7,469,338 B2 | 12/2008 | Buer | |
| 7,469,345 B2 | 12/2008 | Shimada et al. | |
| 7,474,750 B2 | 1/2009 | Lekatsas et al. | |
| 7,607,177 B2 | 10/2009 | Estakhri et al. | |
| 7,765,373 B1 | 7/2010 | Merry et al. | |
| 7,912,991 B1 | 3/2011 | Merry et al. | |

(Continued)

FOREIGN PATENT DOCUMENTS

EP 0 387 599 A2 9/1990
EP 1 164 588 A2 12/2001

(Continued)

*Primary Examiner* — Charles Rones
*Assistant Examiner* — Tian-Pong Chang

(57) ABSTRACT

Embodiments described herein include systems and methods for managing security of a storage subsystem. Certain of these embodiments involve the use of a buffer protection module configured to intelligently police requests for access to the subsystem buffer memory.

19 Claims, 3 Drawing Sheets

(56) References Cited

U.S. PATENT DOCUMENTS

| | | |
|---|---|---|
| 7,971,071 B2 | 6/2011 | Walkoe et al. |
| 8,108,692 B1 | 1/2012 | Merry et al. |
| 8,356,184 B1 | 1/2013 | Meyer et al. |
| 2002/0107802 A1 | 8/2002 | Philips |
| 2002/0141583 A1 | 10/2002 | Barnard et al. |
| 2002/0152377 A1 | 10/2002 | Bauman et al. |
| 2002/0166064 A1 | 11/2002 | Harrison |
| 2003/0126455 A1 | 7/2003 | Sako et al. |
| 2003/0145183 A1 | 7/2003 | Muehring |
| 2004/0117309 A1 | 6/2004 | Inoue et al. |
| 2004/0170175 A1 | 9/2004 | Frank et al. |
| 2004/0236918 A1 | 11/2004 | Okaue et al. |
| 2005/0005149 A1 | 1/2005 | Hirota et al. |
| 2005/0060481 A1 | 3/2005 | Belonoznik |
| 2005/0071656 A1 | 3/2005 | Klein et al. |
| 2005/0091509 A1 | 4/2005 | Herberth |
| 2005/0100163 A1 | 5/2005 | Buer |
| 2005/0125692 A1 | 6/2005 | Cox et al. |
| 2005/0185067 A1 | 8/2005 | Estakhri et al. |
| 2005/0210287 A1* | 9/2005 | Paatero .......... 713/201 |
| 2005/0240738 A1 | 10/2005 | Shirogane et al. |
| 2006/0031687 A1 | 2/2006 | Su et al. |
| 2006/0041934 A1 | 2/2006 | Hetzler |
| 2006/0059369 A1 | 3/2006 | Fayad et al. |
| 2006/0080526 A1 | 4/2006 | Kasahara et al. |
| 2006/0092049 A1 | 5/2006 | Dellow |
| 2006/0174055 A1 | 8/2006 | Flynn |
| 2006/0174298 A1 | 8/2006 | Chen et al. |
| 2006/0177068 A1 | 8/2006 | Hatakeyama |
| 2006/0288235 A1 | 12/2006 | Goto |
| 2007/0038827 A1 | 2/2007 | Inooka et al. |
| 2007/0067647 A1 | 3/2007 | Klein |
| 2007/0130625 A1 | 6/2007 | Lee |
| 2007/0168676 A1 | 7/2007 | Fayad et al. |
| 2007/0172053 A1 | 7/2007 | Poirier |
| 2007/0180210 A1 | 8/2007 | Thibadeau |
| 2007/0186117 A1 | 8/2007 | Klein et al. |
| 2007/0192577 A1* | 8/2007 | Kozuch et al. .......... 713/1 |
| 2007/0192610 A1 | 8/2007 | Chun et al. |
| 2007/0223705 A1 | 9/2007 | Kasahara et al. |
| 2007/0260811 A1 | 11/2007 | Merry, Jr. et al. |
| 2008/0109660 A1 | 5/2008 | Mitra |
| 2008/0126616 A1* | 5/2008 | Kumasawa et al. .......... 710/42 |
| 2008/0155180 A1* | 6/2008 | Shibata et al. .......... 711/103 |
| 2008/0189500 A1 | 8/2008 | Jennings et al. |
| 2008/0189557 A1* | 8/2008 | Pipitone et al. .......... 713/193 |
| 2008/0320314 A1 | 12/2008 | Eckleder et al. |
| 2009/0210612 A1* | 8/2009 | Nakanishi et al. .......... 711/103 |
| 2010/0037048 A1* | 2/2010 | Madan .......... 713/165 |
| 2010/0205152 A1* | 8/2010 | Ansari et al. .......... 707/654 |
| 2011/0154061 A1* | 6/2011 | Chilukuri et al. .......... 713/193 |
| 2011/0161551 A1* | 6/2011 | Khosravi et al. .......... 711/103 |

FOREIGN PATENT DOCUMENTS

| | | |
|---|---|---|
| EP | 1 587 095 A2 | 10/2005 |
| GB | 2 374 718 A | 10/2002 |

* cited by examiner

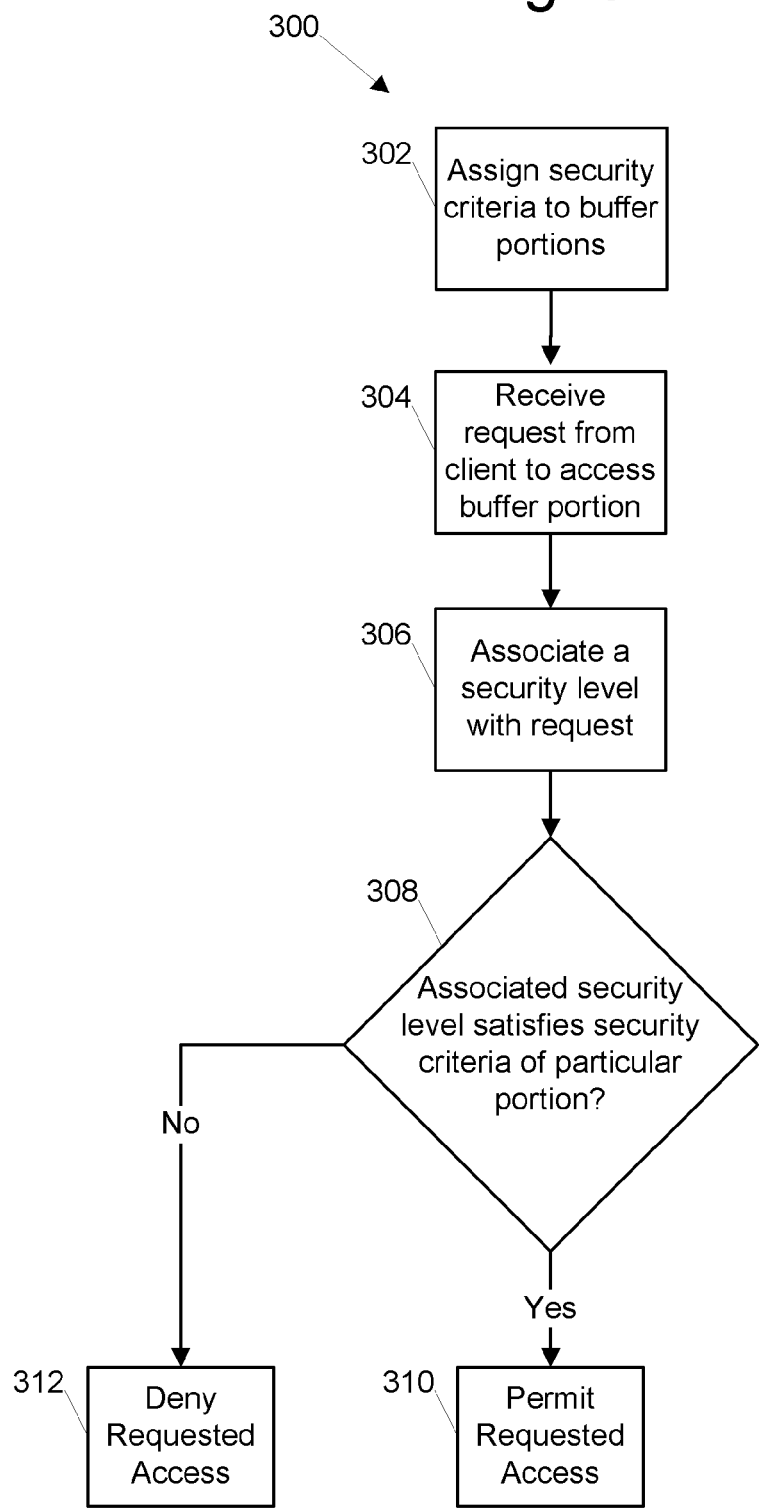

BUFFER MEMORY PROTECTION UNIT

BACKGROUND

1. Technical Field

This disclosure relates to storage devices, which can include disk drives and solid state memory subsystems, for example. More particularly, this disclosure relates to techniques for managing data security in a memory subsystem.

2. Description of the Related Art

Storage subsystems such as disk drives, solid state memories, and the like, generally conform to certain security criteria. Such security measures are intended to protect user data from unauthorized access, which can come from rogue firmware installed on the subsystem, as one example. Existing techniques involve the use encryption, but can increase gate count by undesirable amounts in some cases. Thus, there is a need for a storage subsystem capable of managing drive security in an efficient and robust manner.

BRIEF DESCRIPTION OF THE DRAWINGS

FIG. 3 shows a flowchart of an example process for managing security in a memory subsystem in accordance with some embodiments.

DETAILED DESCRIPTION OF SPECIFIC EMBODIMENTS

Embodiments described herein include systems and methods for managing security in a storage subsystem. Certain of these embodiments involve the use of a buffer protection module configured to intelligently police requests for access to the subsystem buffer memory. Specific embodiments of systems and processes will now be described with reference to the drawings. This description is intended to illustrate specific embodiments of the inventions, and is not intended to be limiting. Thus, nothing in this description is intended to imply that any particular component, step or characteristic is essential. The inventions are defined only by the claims.

Figure 1:
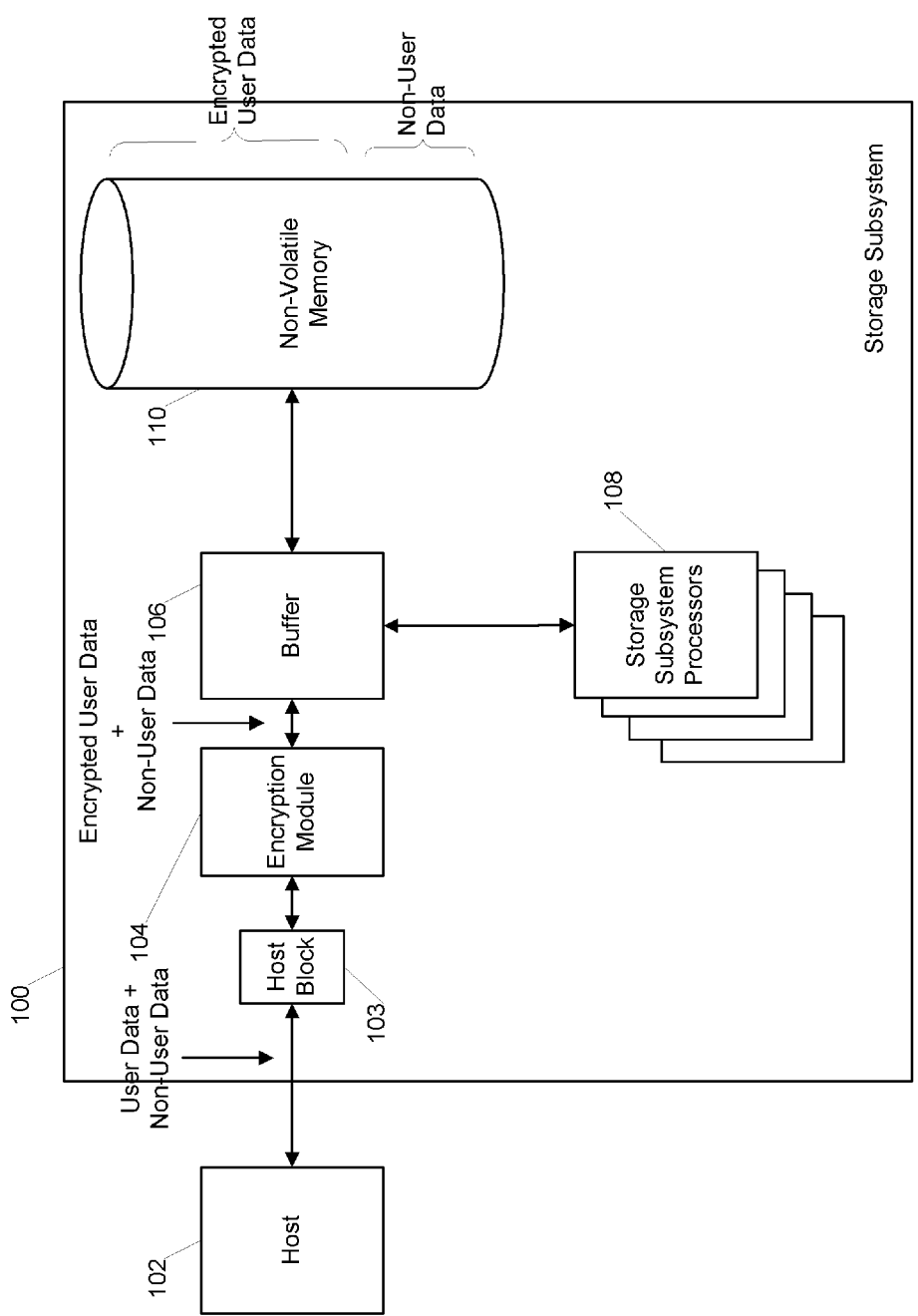
FIG. 1 schematically depicts an example storage subsystem in which an encryption module is included before the memory buffer in the subsystem data path.

FIG. 1 shows an example storage subsystem 100. The storage subsystem 100 may be in communication with a host system 102, and includes a host block 103, an encryption module 104, a buffer 106 in communication with a set of storage subsystem processors 108, and a non-volatile memory 110.

The host block 103 generally provides an interface between the host and the other components of the subsystem 100. The encryption module 104 can implement any appropriate encryption scheme or set of encryption schemes. Commands from the host 102 can include requests to access user and non-user data, and the user data may be subject to particular security requirements. User data may generally include any data written to the subsystem by the host 202 during normal drive operation. Some examples of non-user data are subsystem configuration data and subsystem firmware code. Thus, on write requests the encryption module 104 generally encrypts the user data before the data is written to the buffer 106. The storage subsystem processors 108 therefore have access only to encrypted user data, providing protection from possible unauthorized access by firmware executing in one of the subsystem processors 108, or from other unauthorized sources. Including the encryption module 104 before the buffer in the subsystem data path can significantly raise the overall gate count of the subsystem 100 in some cases. Where the encryption module 104 is arranged in the manner depicted in FIG. 1 with respect to the other subsystem components, the encryption module 104 may be described as being on the "host side" of the subsystem 100.

System Overview

Figure 2:
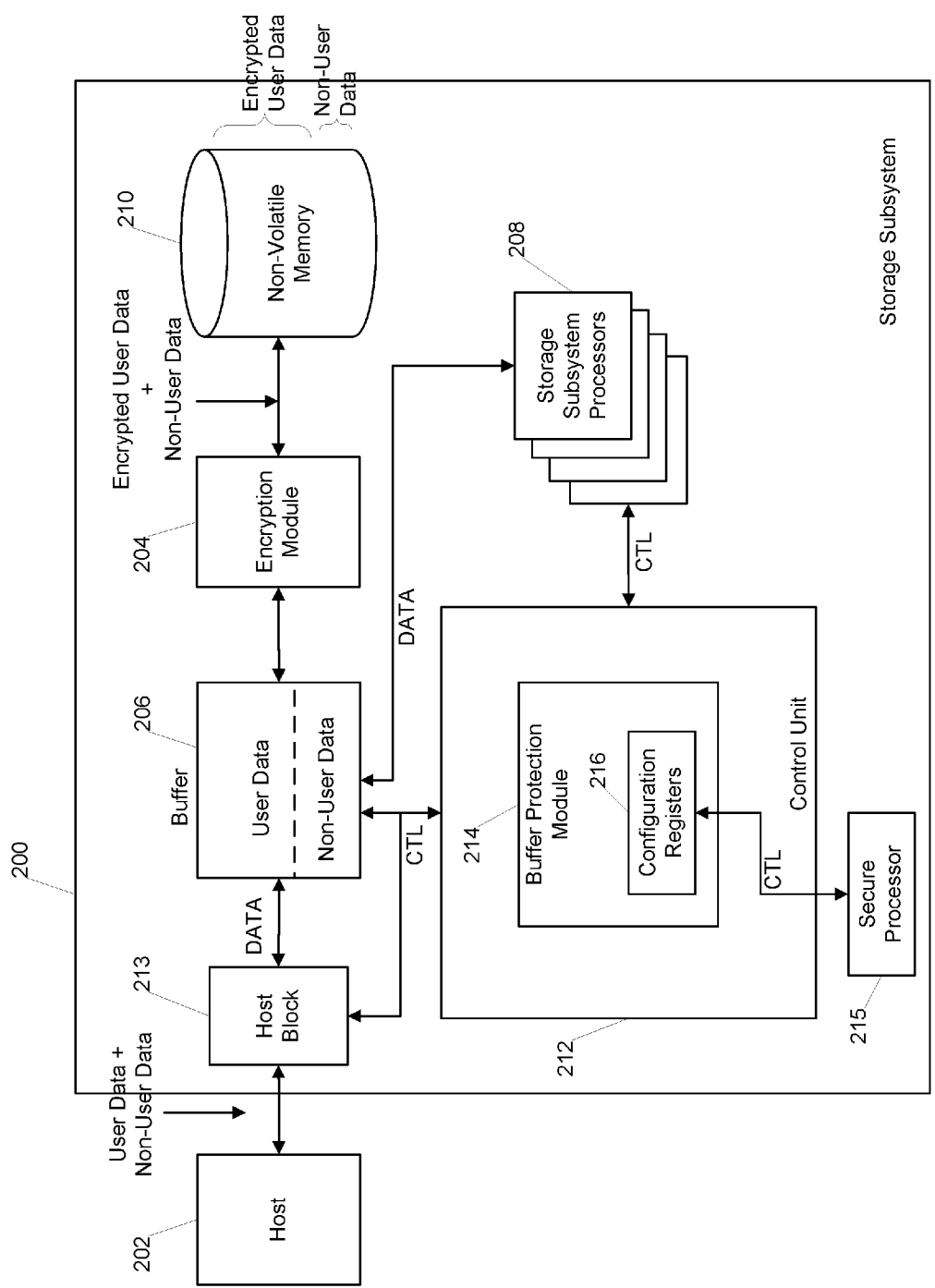
FIG. 2 schematically depicts an example storage subsystem including a buffer protection module in accordance with certain embodiments.

FIG. 2 schematically depicts another example storage subsystem 200, where an encryption module 204 is located after the buffer 206 in the subsystem data path. Similar to the subsystem 100 of FIG. 1, the storage subsystem 200 may be in communication with a host system 202, such as a server, desktop computer, laptop computer, mobile computing device such as a smartphone, or some other appropriate computing device. The subsystem 200 includes an encryption module 204, a buffer 206 in communication with a set of storage subsystem processors 208, and a non-volatile memory 210. The storage subsystem further includes a control unit 212 having a buffer protection module 214, and a secure processor 215 in communication with a set of configuration registers 216 associated with the buffer protection module 214.

Positioning the encryption module 204 after the buffer 206 can advantageously reduce the subsystem gate count, reducing implementation cost and power consumption. Where the encryption module 204 is arranged in the manner depicted in FIG. 2, the encryption module 204 may be described as being on the "disk side" of the subsystem 200. In one embodiment, positioning the encryption module 204 on the disk side can reduce the gate count associated with implementing the encryption module 204 by about 85 percent as compared to where the encryption module 204 resides on the host side of the subsystem 100 (FIG. 1). For instance, the encryption module may include about 2,000,000 gates when positioned on the host side of the subsystem, and about 300,000 gates when positioned on the disk side of the subsystem 200.

The non-volatile memory 210 can include at least one non-volatile memory device, which may be a hard-disk, a solid-state memory, some other type of addressable storage subsystem, or any combination thereof. The non-volatile memory 210 is arranged as a plurality of addressable memory locations that can be organized in a variety of manners.

The buffer 206 can include or reside in a portion of an addressable memory, which in one embodiment is a volatile memory. The volatile memory can be dynamic random access memory (DRAM), such as dual data rate (DDR) DRAM, for example. In other cases, the buffer 206 includes or resides in non-volatile memory. The buffer 206 in some embodiments comprises or is implemented in a memory that is separate from and/or different the non-volatile memory 210.

The storage subsystem processors 208 can include a variety or processors configured to perform corresponding drive functions to manage the operation of the storage subsystem 200. As just a few examples, the subsystem processors 208 can include one or more of a main processor, an interface processor, a flash processor, or a servo processor. The processors 208 may include microprocessors executing firmware code, field-programmable gate arrays (FPGAs), application-specific circuitry, or combinations thereof. Firmware may be stored in any appropriate type of non-transitory computer readable medium, such as a solid state memory device. Because the host 202 and the subsystem processors 208 have access to the buffer 206, they may also be referred to herein as "buffer clients".

The encryption module 204 can implement any appropriate encryption scheme or set of encryption schemes. Similar to the subsystem processors 208, the encryption module 204 may be implemented by one or more microprocessors executing firmware, in an FPGA, in application-specific circuitry, or a combination thereof. The encryption module 204 generally encrypts data prior to writing the data to the non-volatile storage 210.

In one embodiment, the control unit 212 (including the buffer protection module 214) is implemented by a combination of application-specific circuitry and one or more microprocessors executing firmware. The control unit 212 may logically comprise a plurality of functional blocks which are each dedicated to a respective function. For instance, a host block 213 may generally act as an interface between the host 202 and the buffer 206. As another example, a disk block (not shown) may interface with the non-volatile memory 210. Other functional blocks may exist instead of or in addition to the host block 213 and the disk block.

The buffer protection module 214 in one embodiment is implemented in distributed fashion across multiple components. For example, the buffer protection module 214 may be distributed across one or more blocks of the control unit 212 (e.g., the host block 213 and/or disk block). In another configuration, the buffer protection module 214 is implemented as a separate module. The buffer protection module 214 can be implemented at least in part in hardware, and in one embodiment is implemented completely or substantially completely in hardware, improving performance. In another embodiment, the buffer protection module is implemented at least in part in firmware.

The buffer protection module 214 generally manages accesses to the buffer 206. In particular, the buffer protection module 214 in certain embodiments allows only authorized access to unencrypted (e.g., clear text) user data stored in the buffer 206. The access may be provided according to a security policy, which may at least in part be defined by values stored in the configuration registers 216. While the configuration registers 216 can in some embodiments provide the ability to program the buffer protection module 214 and thereby modify the security policy, the security policy or certain aspects thereof is fixed in some cases.

The secure processor 215 can modify the configuration registers 216, which may be implemented by one or more microprocessors, application-specific circuitry, or in some other appropriate fashion. Importantly, the storage subsystem processors 208 may not have the ability to modify the configuration registers 216. For example, firmware running on the secure processor 215 can write and/or read the configuration registers 216, but firmware running on the subsystem processors 208 (or other buffer clients) cannot modify the configuration registers 216. In some implementations, the secure processor 216 is the only component provided access to the configuration registers 216 and/or or capable of programming the buffer protection module 214, providing additional security. In some other cases, the buffer clients are provided some form of limited access to the configuration registers 216, such as read-only access. In this manner, the buffer clients can review the security policy by reading the configuration registers 216, but do not have the ability to modify the policy. In one embodiment, the subsystem 200 includes a separate, dedicated control channel (e.g., a separate hardware path) for communication between the secure processor 215 and the configuration registers 216.

According to the security policy, the buffer protection module 214 assigns security criteria to different portions of the buffer 206. And, each portion may be designated to a particular data type, such that data of a particular type is stored in the respective buffer portion 206. For instance, according to the security policy, the buffer protection module 214 may designate a certain set of addresses in the buffer 206 as a user data portion and assign that portion particular security criteria. As one example security criteria, the policy may allow user data segments to be directly accessible by the host block 213, and only indirectly accessible by the subsystem processors 208. Another set of addresses may be designated as a non-user data portion, and be assigned different security criteria. For instance, the non-user data portions in one embodiment are directly accessible by the subsystem processors 208, but not accessible by the host block 213.

In some cases, the security policy dictates that there are multiple portions designated to a particular data type, with the portions having different security criteria. For instance, a first portion may be designated as a user data portion and be assigned a first storage criteria, and a second (third, fourth, etc.) portion may also be designated as a user data portion, but be assigned second, different storage criteria. For instance, some user data portions may be designated as secured data portions for which the buffer protection module 214 enforces a relatively strict security policy. On the other hand, other user data portions may be designated as un-secured portions, and the buffer protection module 214 may provide more relaxed access to these portions. Similarly, there may be multiple non-user data portions of the buffer 206 having different security criteria.

Based on the assigned security criteria, the buffer protection module 214 may allow direct access to the respective buffer portions by particular subsystem components. On the other hand, the buffer protection module 214 may deny access or allow some form of limited access (e.g., indirect access) by other components. For instance, in some embodiments, the host block 213 is provided direct access to user data portions of the buffer 206, but not to non-user data portions of the buffer 206. Moreover, the subsystem processors 208 in some configurations are provided only limited (e.g., indirect) access to the user data portions of the buffer 206, and are provided direct access to non-user data portions. In general, indirect access may involve a particular buffer client instructing or requesting another component to perform a desired buffer operation, where the particular buffer client does not receive direct access to or the ability to modify the data.

The above examples are provided only for the purposes of illustration. The policy can be implemented in a variety of other ways, depending on the embodiment. For instance, while user data and non-user data portions are described above, the buffer 206 may be apportioned based on other data types or any other appropriate parameter. In addition, while the subsystem processors 208 are described for simplicity as having common associated security criteria, each of the subsystem processors 208 (or any other buffer clients) can have unique associated security criteria in other embodiments.

Example Operation of the Buffer Protection Module

The operation of the buffer protection module 214 will now be described with respect to example scenarios in which one or more components of the subsystem 200 attempt to access the buffer 206. Types of buffer access requests can include, without limitation, write, read, erase and transfer requests.

In a first example scenario, a command to perform a memory operation is issued by the host 202 and involves a request to write data to the buffer 206. In this example, the security criteria assigned to user data portions of the buffer 206 by the buffer protection module 214 allows direct access by the host block 213. The control unit 212 receives and parses the command. The buffer protection unit 214 analyzes the request, and determines whether the request to write data to the buffer 206 is authorized. For example, the buffer protection unit 214 determines whether the request is to write to a portion of the buffer 206 designated as a user data portion, or rather to a portion of the buffer 206 designated as a non-user data portion. Because the request is from the host block 213 and implicates a user data portion of the buffer 206, the buffer protection module 214 determines that the request is authorized, and allows the write request to take place. A host command involving a request to read data from the buffer 206 may be handled in a similar fashion. If, on the other hand, the host command involved a request to write to a non-user data portion of the buffer 206, the buffer protection unit 214 may have denied the request, returning an error condition to the host block 213.

According to another example scenario, one of the storage subsystem processors 208 initiates a request to read user data from the buffer 206. In the example case, the security policy implemented by the buffer protection module 214 dictates that user data portions of the buffer 206 are only indirectly accessible by the particular storage subsystem processor 208 requesting access. The buffer protection module 214 parses and analyzes the request, and determines that the request is for direct access to a user data portion of the buffer 206 by a storage subsystem processor 208 that has only indirect access to user data portions. Thus, the buffer protection module 214 denies the request. In some embodiments, the buffer protection module 214 or other component of the subsystem 200 may trigger an alert or initiate remedial action in response to the unauthorized access attempt (or in response to a threshold number of attempts).

FIG. 3 illustrates a flowchart of an example process 300 for managing security in a memory subsystem. The process 300 of FIG. 3 is described in relation to the memory subsystem 200 of FIG. 2, and may be implemented by the control unit 212 and/or other appropriate components of the memory subsystem 200 of FIG. 2. The process 300 may, however, also be implemented by other compatible memory subsystems.

At operational block 302, the buffer protection module 214 assigns security criteria to portions of the buffer 206. For example, the security criteria may be defined at least in part by values set in the configuration registers 216, which can in some cases by modified by a user. In some embodiments, some or all of the security criteria is fixed in hardware.

At operational block 304, the buffer protection module 214 receives a request from a buffer client (e.g., the host block 213 or a subsystem processor 208) to access a portion of the buffer. For example, the request may be to read, write or erase a particular set of addresses in the buffer. The buffer protection module 214 associates a security level or policy with the request at operational block 306. For instance, the security level may depend on the component that is requesting the access. In one embodiment, the component requesting access is the host block 213, and the security level associated with the host block 213 may be direct access to user data and no access to non-user data. In another embodiment, the component requesting access is a storage subsystem processor 208, and the security level associated with the particular storage subsystem processor is direct access to user data and only indirect access to non-user data. In one embodiment, the buffer protection 214 accesses the configuration registers 216 to determine the appropriate security level or policy.

The buffer protection module 214 can associate the security level to the request based on a variety of factors. For instance, as described, the security level can be assigned based on an identity of the requesting buffer client and a data type associated with the request. The security level can additionally be assigned based on one or more buffer addresses (e.g., a starting address) associated with the request, the length of the request, the type of request (e.g., write, read, transfer, erase), or any combination thereof. As one example, the buffer protection module 214 may determine the data type and associated security level based on a logical address or set of logical addresses associated with the request.

Upon associating the proper security level to the request, at operational block 308 the buffer protection module 214 determines whether the associated security level satisfies the security criteria for the particular portion of the buffer 206. If the security level does satisfy the security criteria, the buffer protection module 214 permits the requested access at operation block 310. For instance, where the request was from the host block 213 for access to a user data portion of the buffer 206, the buffer protection module 214 determines that the security level associated with the host block 213 satisfies the security criteria.

On the other hand, if the security level does not satisfy the security criteria, the buffer protection module 214 denies the requested access at block 312. For instance, where the request is for direct access to a user data portion of the buffer 206 by a storage subsystem processor 208, the buffer protection module 214 determines that the security level associated with the storage subsystem processor 208 does not satisfy the security criteria.

The features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A storage apparatus in communication with a host computing system and configured to enforce a security policy for data stored in a buffer of the storage apparatus, the storage apparatus comprising a housing that encloses a plurality of hardware elements, the plurality of hardware elements comprising:

a buffer located within the storage apparatus, the buffer comprising addressable memory and configured to store data associated with commands received from a host computing system;

at least one non-volatile memory device located within the storage apparatus;

an encryption module comprising a plurality of gates, the encryption module in communication with the buffer and located between the buffer and the at least one non-volatile memory device in a hardware datapath within the storage apparatus, the encryption module configured to apply an encryption scheme to data received from the buffer so that encrypted data is stored in the at least one non-volatile memory device;

a plurality of buffer clients in communication with the buffer and configured to request access to unencrypted data stored in the buffer, the plurality of buffer clients comprising a plurality of hardware processors located within the storage apparatus; and a buffer protection module within the storage apparatus and in communication with the plurality of buffer clients and the buffer and configured to manage access to the unencrypted data stored in the buffer by the plurality of buffer clients, the buffer protection module distinct from the plurality of buffer clients, the buffer protection module further configured to:

assign security criteria to portions of the buffer, each portion corresponding to at least one storage location in the buffer and at least some of the portions being assigned different security criteria;

in response to a request from a buffer client from the plurality of buffer clients to access the unencrypted data stored in a particular portion of the buffer, associate a security level with the request;

determine whether the security level satisfies the security criteria assigned to the particular portion of the buffer;

when the security level associated with the request satisfies the security criteria assigned to the particular portion of the buffer, permit the requested access to stored unencrypted data; and when the security level associated with the request does not satisfy the security criteria assigned to the particular portion of the buffer, deny the requested access to stored unencrypted data, wherein a portion of the buffer having a first assigned security criteria is directly accessible by a first buffer client of the plurality of buffer clients and indirectly accessible by a second buffer client of the plurality of buffer clients, wherein indirectly accessing comprises the second buffer client requesting the first buffer client to perform a buffer operation on the portion of the buffer having the first assigned security criteria.

2. The storage apparatus of claim 1, wherein each portion of the buffer is associated with a particular data type.

3. The storage apparatus of claim 1, wherein the portions of the buffer include one or more portions storing user data associated with commands received from the host computing system and assigned at least a first security criteria and one or more other portions storing non-user data and associated with at least a second security criteria.

4. The storage apparatus of claim 1, wherein user data is stored in the portion of the buffer having the first assigned security criteria.

5. The storage apparatus of claim 1, wherein the buffer comprises volatile memory.

6. The storage apparatus of claim 1, wherein the buffer clients include a host interface block and one or more processors of the storage apparatus.

7. The storage apparatus of claim 1, wherein the buffer protection module associates the security level to the request based at least in part on an identity of the requesting buffer client, a data type associated with the request, one or more buffer addresses associated with the request, the length of the request, or any combination thereof.

8. The storage apparatus of claim 1, wherein at least a portion of the buffer protection module is implemented in hardware.

9. The storage apparatus of claim 1, wherein the number of gates in the plurality of gates of the encryption module, when the encryption module is located between the buffer and the non-volatile memory, is at least 75% less than a second encryption module in a second storage apparatus when the second encryption module is located between a host interface and a buffer of the second storage apparatus.

10. The storage apparatus of claim 1, further comprising a set of programmable configuration registers, wherein at least some of the security criteria is defined by values stored in the configuration registers.

11. The storage apparatus of claim 10, further comprising a secure processor having the ability to modify the configuration registers, wherein the buffer clients do not have the ability to modify the configuration registers.

12. A method of enforcing a security policy for data stored in a buffer of a storage apparatus that is in communication with a host computing system, the method comprising:

storing unencrypted data associated with commands received from the host computing system in a buffer located within a storage apparatus that encloses a plurality of hardware elements, the buffer comprising addressable memory;

assigning security criteria to portions of the buffer, wherein at least some of the portions are assigned different security criteria;

in response to a request from one or more buffer clients comprising one or more storage apparatus processors located within the storage apparatus to access a particular portion of the buffer that stores unencrypted data, associating a security level with the request;

determining, using a buffer protection module included in the storage apparatus, whether the security level associated with the request satisfies the security criteria assigned to the particular portion of the buffer, wherein:

when the security level associated with the request satisfies the security criteria assigned to the particular portion of the buffer, permitting the requested access to the unencrypted data; and when the security level associated with the request does not satisfy the security criteria assigned to the particular portion of the buffer, denying the requested access to the unencrypted data;

receiving data from the buffer for storing in at least one non-volatile memory device of the storage apparatus;

using an encryption module comprising a plurality of gates to apply an encryption scheme to the data received from the buffer, the encryption module included in the storage apparatus and located in a hardware datapath within the storage apparatus between the buffer and the at least one non-volatile memory device; and storing encrypted data in the at least one non-volatile memory device.

13. The method of claim 12, wherein the steps of the method are performed by the storage apparatus.

14. The method of claim 12, wherein said assigning security criteria to portions of the buffer comprises assigning at least one first security level to one or more portions storing user data associated with commands received from the host computing system and assigning at least one second security level to one or more other portions storing non-user data.

15. The method of claim 12, wherein said assigning security criteria comprises assigning a first security criteria to one of the portions of the buffer that allows direct access by a first set of one or more buffer clients to the portion of the buffer and allows only indirect access by a second set of one or more buffer clients to the portion of the buffer.

16. The method of claim 12, wherein the buffer comprises volatile memory.

17. The method of claim 12, wherein said associating a security level with the request comprises associating the security level to the request based at least in part on an identity of the requesting buffer client, a data type associated with the request, one or more buffer addresses associated with the request, the length of the request, or any combination thereof.

18. A method of enforcing a security policy for a buffer memory in a storage apparatus comprising a housing that encloses a plurality of hardware elements, the method comprising:

storing unencrypted data associated with commands received from a host computing system in a buffer located within a storage apparatus, the buffer comprising addressable memory;

accessing values stored in one or more programmable configuration registers of the storage apparatus;

assigning security criteria to portions of the buffer based at least in part on the accessed values from the configuration registers, at least some of the portions of the buffer being assigned different security criteria;

in response to a request from one of one or more buffer clients to access a particular portion of the buffer that stores unencrypted data, selectively permitting the request based on the assigned security criteria, wherein the one or more buffer clients comprise a plurality of hardware processors located within the storage apparatus;

receiving data from the buffer for storing in at least one non-volatile memory device of the storage apparatus; and encrypting, using an encryption module comprising a plurality of gates and located within the storage apparatus between the buffer and the at least one non-volatile memory device, the received data and storing encrypted data in the at least one non-volatile memory device, wherein the steps of the method are performed by the storage apparatus.

19. A storage apparatus in communication with a host computing system and configured to enforce a security policy for data stored in a buffer of the storage apparatus, the storage apparatus comprising a housing that encloses a plurality of hardware elements, the plurality of housing elements comprising:

a buffer located within the storage apparatus, the buffer comprising addressable memory and configured to store data associated with commands received from a host computing system;

at least one non-volatile memory device located within the storage apparatus;

an encryption module comprising a plurality of gates, the encryption module in communication with the buffer and located between the buffer and the at least one non-volatile memory device in a datapath within the storage apparatus, the encryption module configured to apply an encryption scheme to data received from the buffer so that encrypted data is stored in the at least one non-volatile memory device;

one or more buffer clients in communication with the buffer and configured to request access to unencrypted data stored in the buffer, the one or more buffer clients comprising one or more hardware processors located within the storage apparatus; and a buffer protection module within the storage apparatus and in communication with the one or more buffer clients and the buffer and configured to manage access to the unencrypted data stored in the buffer by the one or more buffer clients, the buffer protection module distinct from the one or more buffer clients, the buffer protection module further configured to:

assign security criteria to portions of the buffer, each portion corresponding to at least one storage location in the buffer and at least some of the portions being assigned different security criteria;

in response to a request from a buffer client to access the unencrypted data stored in a particular portion of the buffer, associate a security level with the request based at least in part on one or more buffer addresses of the request;

determine whether the security level satisfies the security criteria assigned to the particular portion of the buffer;

when the security level associated with the request satisfies the security criteria assigned to the particular portion of the buffer, permit the requested access to stored unencrypted data; and when the security level associated with the request does not satisfy the security criteria assigned to the particular portion of the buffer, deny the requested access to stored unencrypted data.

\* \* \* \* \*